United States Patent
Nomura et al.

(10) Patent No.: US 8,862,946 B2
(45) Date of Patent: Oct. 14, 2014

(54) INFORMATION PROCESSING APPARATUS AND INFORMATION PROCESSING METHOD

(75) Inventors: Yuji Nomura, Kawasaki (JP); Toshimasa Arai, Kawasaki (JP); Tomohiro Muramoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 246 days.

(21) Appl. No.: 13/184,630

(22) Filed: Jul. 18, 2011

(65) Prior Publication Data
US 2012/0023378 A1    Jan. 26, 2012

(30) Foreign Application Priority Data

Jul. 26, 2010  (JP) ................................. 2010-167060

(51) Int. Cl.
G06F 11/00    (2006.01)
G06F 11/07    (2006.01)

(52) U.S. Cl.
CPC .......... *G06F 11/0709* (2013.01); *G06F 11/076* (2013.01); *G06F 11/0757* (2013.01)
USPC ......................................... 714/47.1; 714/4.1

(58) Field of Classification Search
CPC .................................................... G06F 11/076
USPC ............ 714/47.2, 47.1, 47.3, 46, 48, 4.3, 4.5, 714/704
See application file for complete search history.

(56) References Cited

U.S. PATENT DOCUMENTS

| | | | |
|---|---|---|---|
| 7,502,860 B1* | 3/2009 | Champagne | 709/227 |
| 2002/0114292 A1 | 8/2002 | Kawabata et al. | |
| 2010/0042675 A1* | 2/2010 | Fujii | 709/203 |
| 2011/0295996 A1* | 12/2011 | Qiu et al. | 709/224 |

FOREIGN PATENT DOCUMENTS

| | | |
|---|---|---|
| JP | 11-178049 A | 7/1999 |
| JP | 11-308221 A | 11/1999 |
| JP | 2000-293450 A | 10/2000 |
| JP | 2002-73431 A | 3/2002 |
| JP | 2007-199976 A | 8/2007 |
| JP | 2010-86203 A | 4/2010 |
| JP | 2010-122956 A | 6/2010 |

OTHER PUBLICATIONS

Yosuke Miyamoto,"Let's Use Hinemos! Management & Monitor", Software Design, Gijutsu-Hyohron Co., Ltd., Feb. 18, 2008, No. 208, pp. 49-58, see JPOA filed herewith.

Japanese Office Action issued Mar. 4, 2014 for corresponding Japanese Patent Application No. 2010-167060, with Partial Translation, 7 pages.

Japanese Office Action mailed Aug. 5, 2014 for corresponding Japanese Patent Application No. 2010-167060, with Partial Translation.

* cited by examiner

*Primary Examiner* — Dieu-Minh Le
(74) *Attorney, Agent, or Firm* — Fujitsu Patent Center

(57) ABSTRACT

An information processing apparatus receives a request transmitted from a client to a server and a response transmitted from the server to the client. The information processing apparatus includes a processor. The processor counts a first number of first requests having no corresponding response within a first time period, counts a second number of second requests having a corresponding response, and detects a failure in the server on the basis of the first number and the second number.

20 Claims, 14 Drawing Sheets

| TCP CONNECTION ID | PATH | TIME OF REQUEST |
|---|---|---|
| A | path1/path2/name1.cgi | 10:12:54 |
| B | path3/path4/name5.cgi | 10:13:07 |
| ... | ... | ... |
| C | path6/path7/name8.cgi | 10:11:23 |

FIG. 3

| PATH | REQUEST HASH VALUE | RESPONSE HASH VALUE |
|---|---|---|
| path1/path2/name1.jsp | FIXED | CHANGED |
| path3/path4/name5.jsp | CHANGED | CHANGED |
| path6/path7/name8.cgi | CHANGED | CHANGED |
| ... | ... | ... |
| path9/img.gif | FIXED | FIXED |

| PATH | NUMBER OF RESPONSES | AVERAGE RESPONSE TIME | RESPONSE TIME DISTRIBUTION |
|---|---|---|---|
| path1/path2/name1.jsp | 7890 | 246 msec | 40 msec |
| path3/path4/name5.jsp | 1824 | 543 msec | 109 msec |
| path6/path7/name8.cgi | 3349 | 112 msec | 203 msec |
| ... | ... | ... | ... |
| path9/img.gif | 40122 | 2 msec | 1 msec |

INFORMATION PROCESSING APPARATUS AND INFORMATION PROCESSING METHOD

CROSS-REFERENCE TO RELATED APPLICATION

This application is based upon and claims the benefit of priority of the prior Japanese Patent Application No. 2010-167060, filed on Jul. 26, 2010, the entire contents of which are incorporated herein by reference.

FIELD

The embodiments discussed herein are related to an information processing apparatus.

BACKGROUND

As a system including a plurality of servers, known is a three-layer system that includes a web server, an application (AP) server and a database (DB) server. In a system including plurality of servers, the whole system may stop due to the stopping of a part of the system.

A failure in which the whole system stops due to the stopping of a part of the system will be discussed with reference to FIGS. 12A to 12C. FIGS. 12A to 12C illustrate a three-layer system. The three-layer system 200 has a web server 210, two application servers 220 and three database servers 230. The servers have first-in-first-out (FIFO) queues, respectively. The FIFO queues hold request messages (also referred to as requests) provided from a client 240. Specifically, the web server 210 has a FIFO queue 300. The two application servers 220 have FIFO queues 310 and 320, respectively. The three database servers 230 have FIFO queues 330, 340 and 350, respectively. A request held by a queue is released by making response to the corresponding request.

The database server 230 that has the FIFO queue 340 provides information regarding a particular service S in response to a request provided from the client 240. For example, when a failure occurs in that database server 230, that database server 230 does not provide a response message (also referred to as a response) for the particular service S and the FIFO queue 340 overflows (refer to FIG. 12A). The database server 230 that has the FIFO queue 340 becomes a nonresponding state due to the overflow of the FIFO queue 340. In addition, the FIFO queues 310 and 320 of the application servers 220 that are each waiting for a response from that database server 230 overflow (refer to FIG. 12B), and the application servers 220 become a nonresponding state. Finally, the FIFO queue 300 of the web server 210 overflows, and whereby the web server 210 may not be able to receive a request from the client 240. As a result, the whole system 200 becomes a nonresponding state (refer to FIG. 12C).

Japanese Laid-open Patent Publication No. 2010-86203 discloses a related technique.

SUMMARY

According to an aspect of the present invention, provided is an information processing apparatus. The information processing apparatus receives a request transmitted from a client to a server and a response transmitted from the server to the client. The information processing apparatus includes a processor. The processor counts a first number of first requests having no corresponding response within a first time period, counts a second number of second requests having a corresponding response, and detects a failure in the server on the basis of the first number and the second number.

The object and advantages of the invention will be realized and attained by means of the elements and combinations particularly pointed out in the claims. It is to be understood that both the foregoing general discussion and the following detailed discussion are exemplary and explanatory and are not restrictive of the invention, as claimed.

BRIEF DESCRIPTION OF DRAWINGS

FIG. 3 is a diagram illustrating an exemplary data structure of a first table according to an embodiment of the present invention;

FIG. 7 is a diagram illustrating an exemplary data structure of a second table according to an embodiment of the present invention;

FIG. 9 is a diagram illustrating an exemplary data structure of a second table according to an embodiment of the present invention;

DESCRIPTION OF EMBODIMENTS

The conventional three-layer system has a problem that when the whole system stops due to the stopping of a part of the system, a failure may not be detected until the system falls in a state in which the system is disabled to receive a request from the client. Thus, it is preferable to detect a sign that a system will stop.

According to the embodiments, a sign of the stopping of the system may be detected.

The embodiments will be discussed with reference to the accompanying drawings.

First Embodiment

Figure 1:
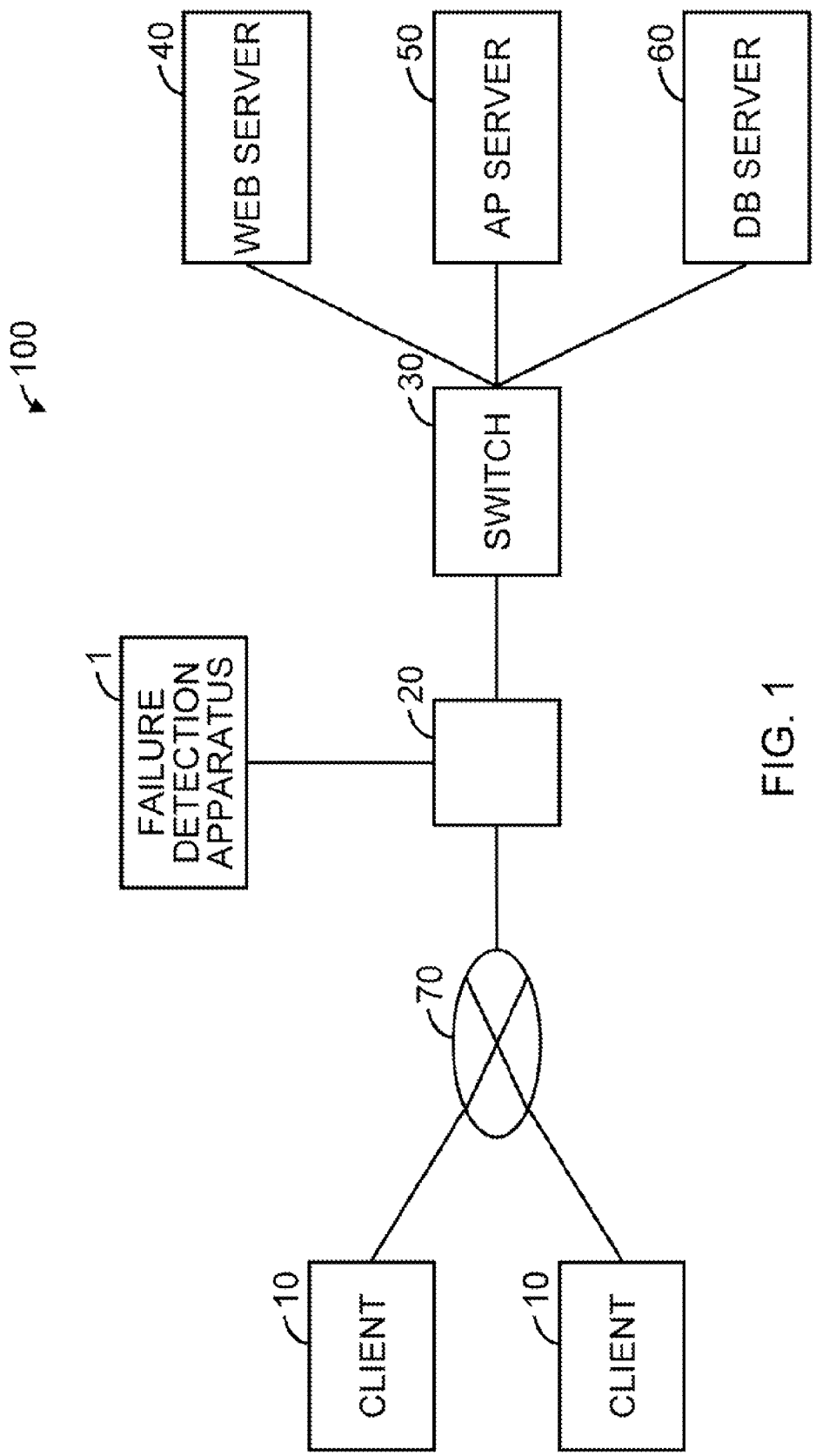
FIG. 1 is a diagram illustrating an exemplary configuration of a system according to an embodiment of the present invention.

FIG. 1 illustrates an exemplary configuration of a system according to the present embodiment. The system 100 includes a failure detection apparatus 1, clients 10, a branch unit 20, a switch 30, a web server 40, an application server 50, a database server 60 and the Internet 70. The clients 10 are communicably connected to the switch 30 through the Internet 70 via the branch unit 20. The branch unit 20 is arranged between the switch 30 and the clients 10. The branch unit 20 is communicably connected to the failure detection apparatus 1. The switch 30 is communicably connected to the web server 40, the application server 50 and the database server 60. The web server 40, the application server 50 and the database server 60 are communicably connected to each other via the switch 30.

The clients 10 are personal computers (PCs), for example. Each client 10 transmits a request through the Internet 70 to the server system including the web server 40, the application server 50 and the database server 60.

The branch unit 20 is a network tap, for example. The branch unit 20 monitors packets transferred between the server system and the clients 10.

The switch 30 is a layer 2 (L2) switch, for example. The switch 30 relays and transfers the packets.

The web server 40 transmits a HyperText Markup Language (HTML) file in response to a request provided from the clients 10.

The database server 60 has a database and performs a process of searching and updating the database. The database server 60 provides information regarding a predetermined service in response to a request provided from the clients 10.

The application server 50 relays data between the web server 40 and the database server 60 and controls the process of searching and updating the database of the database server 60.

In the present embodiment, the web server 40, the application server 50 and the database server 60 form a three-layer system. The web server 40, the application server 50 and the database server 60 have FIFO queues, respectively. Various existing servers may be used as the web server 40, the application server 50 and the database server 60, and a discussion thereof will be omitted.

The failure detection apparatus 1 detects, on the basis of the packets monitored by the branch unit 20, a failure that has occurred in the server system including the web server 40, the application server 50, and the database server 60.

Figure 2:
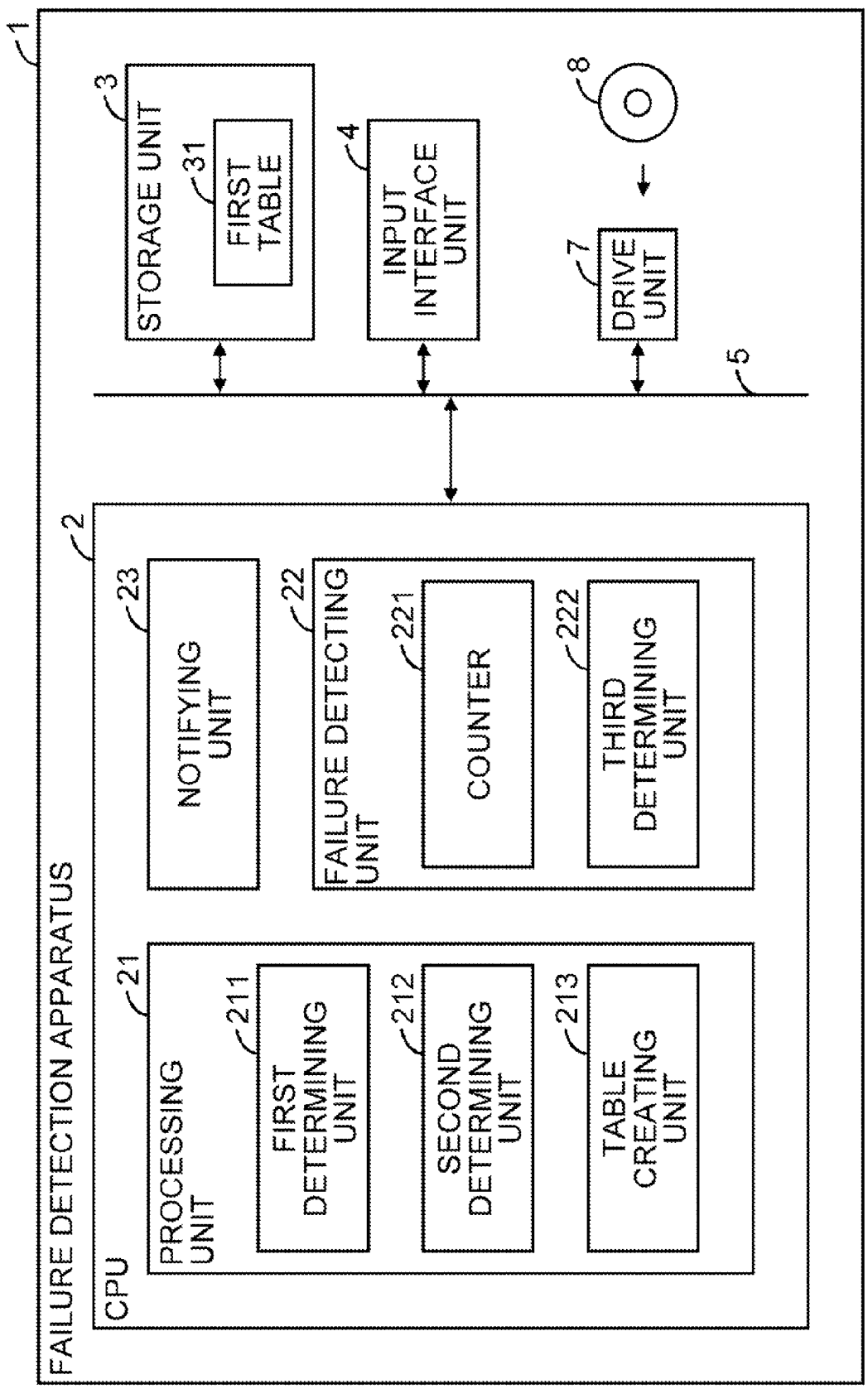
FIG. 2 is a diagram illustrating an exemplary configuration of a failure detection apparatus according to an embodiment of the present invention.

FIG. 2 illustrates an exemplary configuration of the failure detection apparatus 1 according to the present embodiment. The failure detection apparatus 1 illustrated in FIG. 2 includes a central processing unit (CPU) 2, a storage unit 3, an input interface unit 4, and a drive unit 7 for reading data from and/or writing data to a recording medium 8. The CPU 2, the storage unit 3, the input interface unit 4 and the drive unit 7 are communicably connected to each other through a bus 5.

The storage unit 3 is a storage device capable of storing data. For example, the storage unit 3 is a random access memory (RAM), a hard disk drive (HDD), a solid state drive (SSD) or the like. The storage unit 3 stores various types of information. Specifically, the storage unit 3 stores a first table 31 (discussed later).

The input interface unit 4 is a network interface card (NIC), for example. The input interface unit 4 is an interface that is communicably connected to an external network. The input interface unit 4 receives, via the branch unit 20, packets transferred between the clients 10 and the web server 40. The packet transferred between the clients 10 and the web server 40 includes an internet protocol (IP) header portion, a transmission control protocol (TCP) header portion, a HyperText Transfer Protocol (HTTP) header portion and an HTTP body portion, for example. Various existing packets may be used as the packet transferred between the clients 10 and the web server 40, and a discussion thereof will be omitted.

The CPU 2 is a processing unit that performs various calculations and various types of control by executing various application programs stored in the storage unit 3 and achieves various functions by performing the various calculations and the various types of control.

For example, the CPU 2 functions as a processing unit 21, a failure detecting unit 22 and a notifying unit 23 by executing programs.

The processing unit 21 performs various processes on the basis of a packet received by the input interface unit 4. The processing unit 21 includes a first determining unit 211, a second determining unit 212 and a table creating unit 213.

The first determining unit 211 references the HTTP header portion of the packet received by the input interface unit 4 to determine whether the packet received by the input interface unit 4 is a request transmitted from the clients toward the server system or a response transmitted from the server system toward the clients.

When the first determining unit 211 determines that the packet is a request, the second determining unit 212 references a uniform resource locator (URL) described in the HTTP header portion of the packet, for example. The second determining unit 212 determines, on the basis of the referenced URL, whether or not the request of the packet received by the input interface unit 4 is dynamic. Specifically, when an end portion (target information) of the URL indicates a static content, the second determining unit 212 determines that the request of the packet received by the input interface unit 4 is not dynamic. The static content is, for example, image data having an extension of "jpg", "gif" or the like, and a common format or a style sheet having an extension of "html", "css" or the like. On the other hand, when the end portion of the URL indicates a content having an extension of "jsp", "cgi" or the like, that is dynamically generated for each request, the second determining unit 212 determines that the request of the packet received by the input interface unit 4 is dynamic. In other words, the second determining unit 212 functions as a determining unit that determines whether or not the request is dynamic.

A request which is dynamic is a request to which the web server 40 of the three-layer system may not be able to respond by itself and to which the web server 40 may respond by cooperating with the application server 50 and the database server 60. In other words, a request which is dynamic is a request for which an FIFO queue (for example, the FIFO queue included in the application server 50) shared by a plurality of services is used.

A static request is a request to which the web server 40 may respond by itself, for example. A request which is dynamic is a request that easily affects performance of the clients 10 when a response is not provided, compared to the static request.

The table creating unit 213 creates the first table 31. Specifically, the table creating unit 213 creates the first table 31 by recording to the storage unit 3 predetermined information regarding requests (hereinafter also merely referred to as dynamic requests) determined, by the second determining unit 212, to be dynamic.

FIG. 3 illustrates an exemplary data structure of the first table 31 according to the present embodiment. On the first table 31 illustrated in FIG. 3, a path name (hereinafter also merely referred to as a path) included in an URL and a time of request are recorded in association with each TCP connection identifier (ID). The table creating unit 213 records the path and the time of request on the first table 31 for each TCP connection ID.

The TCP connection ID is a pair of an IP address and port number of the client 10 and an IP address and port number of the web server 40. The table creating unit 213 acquires the IP addresses and the port numbers by referencing the IP header portion and the TCP header portion, respectively. In FIG. 3, the TCP connection IDs are indicated by A, B and C for convenience of illustration.

The table creating unit 213 acquires the path by referencing the HTTP header portion of the request.

The time of request is the time when the failure detection apparatus 1 receives the packet. For example, the table creating unit 213 acquires the time of receiving the packet from a timer (not shown) or internal clock (not shown) of the failure detection apparatus 1.

The table creating unit 213 determines whether or not information regarding a request that corresponds to the packet determined to be a response by the first determining unit 211 is already recorded on the first table 31. Specifically, the table creating unit 213 acquires the TCP connection ID from the packet determined to be a response and determines whether or not the acquired TCP connection ID matches a TCP connection ID recorded on the first table 31.

When information regarding a request that corresponds to the response is already recorded on the first table 31, the table creating unit 213 deletes from the first table 31 the information regarding a request that corresponds to the response. Thus, only information regarding requests for which responses have not been provided is recorded on the first table 31.

The table creating unit 213 counts the number of responses provided by the web server 40 as the number of dynamic responses. Specifically, the table creating unit 213 counts the number of the dynamic responses by incrementing the number of the dynamic responses when the table creating unit 213 deletes from the first table 31 information regarding a request that corresponds to a response. In other words, the table creating unit 213 functions as a second counter that counts the number of requests for which responses have been provided.

The failure detecting unit 22 detects a failure of the server system. The failure detecting unit 22 includes a counter 221 and a third determining unit 222.

The counter 221 references the first table 31 to count the number of requests (hereinafter also merely referred to as nonresponded requests) for which responses are not provided for a predetermined time period of T seconds, for example. Specifically, the counter 221 references the time of request recorded on the first table 31 and the timer or the internal clock to count the number of the nonresponded requests. In other words, the counter 221 functions as a first counter that counts the number of requests for which responses are not provided for the predetermined time period.

The time period of T seconds, which is used to determine the number of requests for which responses are not provided, may be 30 seconds, 60 seconds or the like and may be extremely larger than a normal response time of a business application. Thus, T of the time period of T seconds is a value that may be used to determine that a response is not provided for a request. T of the time period of T seconds is not limited to the aforementioned values and may be set to any of various values.

The third determining unit 222 determines whether or not a failure occurs in the server system. Specifically, the third determining unit 222 determines whether or not there is a sign that the server system becomes the nonresponding state, or the third determining unit 222 determines whether or not the server system is in the nonresponding state.

In order to detect a failure, the third determining unit 222 determines whether or not the number of nonresponded requests is equal to or larger than a predetermined threshold M. When the number of the nonresponded requests is equal to or larger than the predetermined threshold M, the third determining unit 222 determines whether or not the number of dynamic responses counted by the table creating unit 213 is equal to or larger than a predetermined threshold N.

When the number of the dynamic responses counted by the table creating unit 213 is equal to or larger than the predetermined threshold N as a result of the determination, the third determining unit 222 determines that there is a sign that the server system becomes the nonresponding state due to the nonresponded requests. In other words, the third determining unit 222 detects a sign that the server system becomes the nonresponding state. When the number of the dynamic responses counted by the table creating unit 213 is smaller than the predetermined threshold N, the third determining unit 222 determines that the server system is in the nonresponding state. In other words, the third determining unit 222 detects the fact that the server system is in the nonresponding state. Thus, the third determining unit 222 functions as a detector that detects a failure on the basis of the number of requests for which responses are not provided and the number of requests for which responses are provided.

It is preferable that the threshold M is approximately 10% of the number of requests that may be held by the queue included in the application server 50 and the threshold N is approximately in a range of 1 to 100, for example.

The notifying unit 23 outputs various types of information to an administrator of the server system. Specifically, when the third determining unit 222 determines that there is a sign that the server system becomes down, the notifying unit 23 notifies the administrator that there is a sign that the server system becomes down due to the nonresponded requests. When the third determining unit 222 determines that the server system is in the nonresponding state, the notifying unit 23 notifies the administrator that the server system is in the nonresponding state.

Regardless of whether or not the number of the dynamic responses is smaller than the threshold N, the notifying unit 23 may selectively notify the administrator of information recorded on the first table 31. For example, the notifying unit 23 may notify the administrator of paths of nonresponded requests recorded on the first table 31 or notify the administrator of a common part of the paths of the nonresponded requests recorded on the first table 31. In addition, the notifying unit 23 may notify the administrator of a time period for which a response is not provided for a nonresponded request.

In addition to notifying the administrator of the various types of information, the notifying unit 23 may store the various types of information in the storage unit 3 as logs.

The notifying unit 23 may notify the administrator of the information by an email, or display the information on a display unit used by the administrator in order to notify the administrator of the information.

Figure 4:
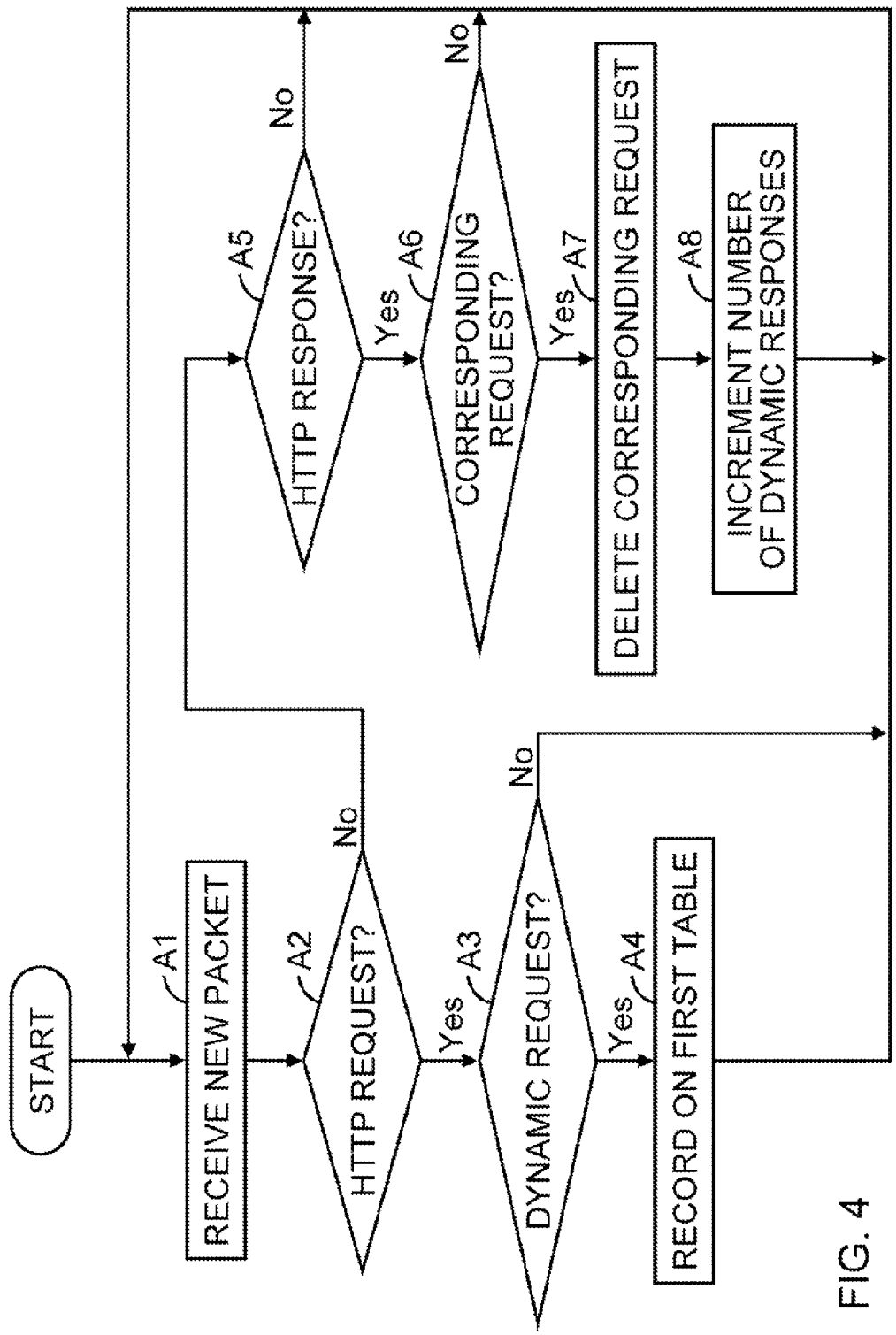
FIG. 4 is a diagram illustrating an exemplary operation flow of a processing unit of a failure detection apparatus according to an embodiment of the present invention.

FIG. 4 illustrates an exemplary operation flow of the processing unit 21 of the failure detection apparatus 1 (configured as discussed above) according to the present embodiment.

In A1, the input interface unit 4 receives a new packet.

In A2, the first determining unit 211 references the HTTP header of the received packet to determine whether or not the received packet is a request.

In A3, when the first determining unit 211 determines that the received packet is a request ("Yes" in A2), the second determining unit 212 references the HTTP header of the received packet to determine whether or not the received packet is a dynamic request.

In A4, when the second determining unit 212 determines that the received packet is a dynamic request ("Yes" in A3), the table creating unit 213 records information regarding the dynamic request on the first table 31.

When the second determining unit 212 determines that the received packet is not a dynamic request ("No" in A3), the table creating unit 213 does not record information regarding this request on the first table 31 and the failure detection apparatus 1 returns the process to A1.

In A5, when the first determining unit 211 determines that the received packet is not a request ("No" in A2), the first determining unit 211 references the HTTP header of the received packet to determine whether or not the received packet is a response.

In A6, when the first determining unit 211 determines that the received packet is a response ("Yes" in A5), the table creating unit 213 determines whether or not information regarding a request that corresponds to the response is already recorded on the first table 31.

In A7, when the table creating unit 213 determines that information regarding a request that corresponds to the response is already recorded on the first table 31 ("Yes" in A6), the table creating unit 213 deletes from the first table 31 the information regarding the request that corresponds to the response.

In A8, the table creating unit 213 increments the number of the dynamic responses by 1 (second counting operation).

When the first determining unit 211 determines that the received packet is not a response ("No" in A5), the failure detection apparatus 1 returns the process to A1. When the table creating unit 213 determines that no information regarding a request that corresponds to the response is recorded on the first table 31 ("No" in A6), the failure detection apparatus 1 returns the process to A1.

Figure 5:
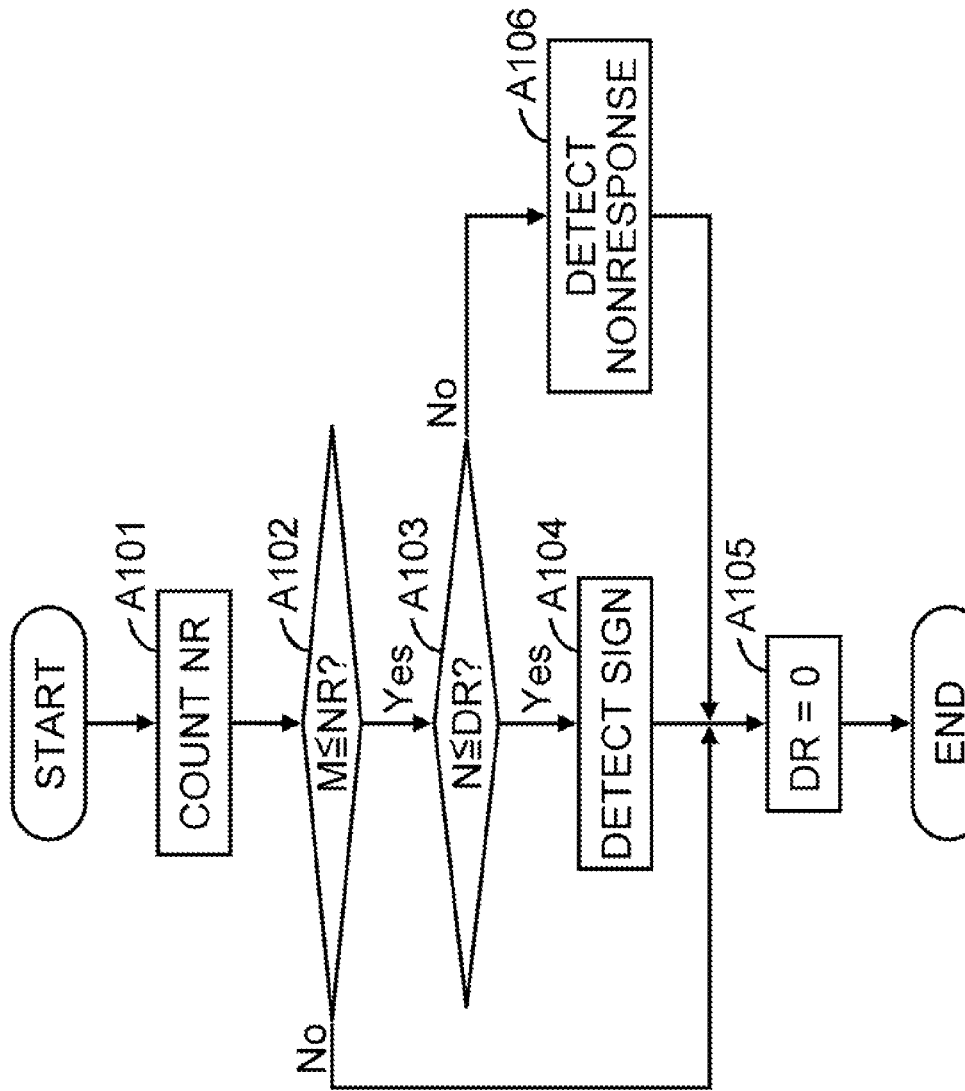
FIG. 5 is a diagram illustrating an exemplary operation flow of a failure detecting unit and a notifying unit of a failure detection apparatus according to an embodiment of the present invention.

FIG. 5 illustrates an exemplary operation flow of the failure detecting unit 22 and the notifying unit 23 of the failure detection apparatus 1 according to the present embodiment.

In A101, the counter 221 references the timer or the internal clock and the first table 31 to count the number (indicated by "NR" in the drawings) of requests (nonresponded requests) for which responses are not provided for the time period of T seconds or more (first counting operation).

In A102, the third determining unit 222 determines whether or not the number NR of the nonresponded requests is equal to or larger than the threshold M.

In A103, when the number NR of the nonresponded requests is equal to or larger than the threshold M ("Yes" in A102), the third determining unit 222 determines whether or not the number (indicated by "DR" in the drawings) of dynamic responses counted by the table creating unit 213 is equal to or larger than the threshold N.

In A104, when the number DR of the dynamic responses counted by the table creating unit 213 is equal to or larger than the threshold N ("Yes" in A103), the third determining unit 222 determines that there is a sign that the server system becomes the nonresponding state (detecting operation). The notifying unit 23 notifies the administrator by an email or the like that there is a sign that the server system becomes the nonresponding state.

In A105, the failure detecting unit 22 resets the number DR of the dynamic responses counted by the table creating unit 213 to zero.

In A106, when the number DR of the dynamic responses counted by the table creating unit 213 is smaller than the threshold N ("No" in A103), the third determining unit 222 determines that the server system is in the nonresponding state, that is, a failure of nonresponse has occurred in the server system (detecting operation). The notifying unit 23 notifies the administrator by an email or the like that the server system is in the nonresponding state.

In A105, the failure detecting unit 22 resets the number DR of the dynamic responses counted by the table creating unit 213 to zero. When the number NR of the nonresponded requests is smaller than the threshold M ("No" in A102), the third determining unit 222 determines that there is no failure in the server system, and the failure detecting unit 22 resets the number DR of the dynamic responses counted by the table creating unit 213 to zero.

A101 to A106 are repeated for each of predetermined cycles.

In this manner, the failure detection apparatus 1 according to the present embodiment may automatically detect a sign that the server system becomes the nonresponding state.

Since the failure detection apparatus 1 according to the present embodiment may detect a sign that the server system becomes the nonresponding state, the failure detection apparatus 1 may reduce the time for determining the location or the cause of the failure, and reduce the time for recovery from the failure.

Since the failure detection apparatus 1 according to the present embodiment may reduce the time for the recovery from the failure, it may be possible to reduce an operation cost.

Since the notifying unit 23 of the failure detection apparatus 1 according to the present embodiment notifies the administrator of a sign that the server system becomes the nonresponding state, the administrator may appropriately deal with the sign before the server system becomes the nonresponding state.

Since the notifying unit 23 of the failure detection apparatus 1 according to the present embodiment selectively notifies the administrator of the information recorded on the first table 31, the administrator may reduce the time for determining the location or the cause of the failure.

Since the notifying unit 23 of the failure detection apparatus 1 according to the present embodiment records the information on the first table 31 as the selective logs, the analysis of the failure occurred in the server system may be performed on the basis of the information that may not remain as a log when a failure of nonresponse occurs in a conventional system. Thus, the failure detection apparatus 1 according to the present embodiment may reduce the time for determining the location or the cause of the failure, and reduce the time for recovery from the failure.

EXAMPLES OF MODIFIED EMBODIMENTS

First Modified Embodiment

The technique disclosed herein is not limited to the first embodiment and may be variously modified and used without departing from the gist of the first embodiment.

For example, the failure detecting unit 22 according to a first modified embodiment functions as the failure detecting unit 22 according to the aforementioned first embodiment and may also detect the occurrence of a failure on the basis of the difference between the number (indicated by "$NR_{PRV}$" in the drawings) of nonresponded requests for which responses are not provided for a previous cycle and the number NR of nonresponded requests for which responses are not provided for a current cycle. In the following discussion, like reference numerals and signs designate like parts.

Specifically, the failure detecting unit 22 according to the first modified embodiment calculates the difference between the number (NR$_{PRV}$) of the nonresponded requests for which responses are not provided for the previous cycle and the number NR of the nonresponded requests for which responses are not provided for the current cycle. In other words, the failure detecting unit 22 calculates the difference between the number (NR$_{PRV}$) of the nonresponded requests for which responses are not provided for the previous cycle (a first time period) and the number NR of the nonresponded requests for which responses are not provided for the current cycle (a second time period) that is immediately succeeding (chronologically adjacent) to the first time period.

Figure 6:
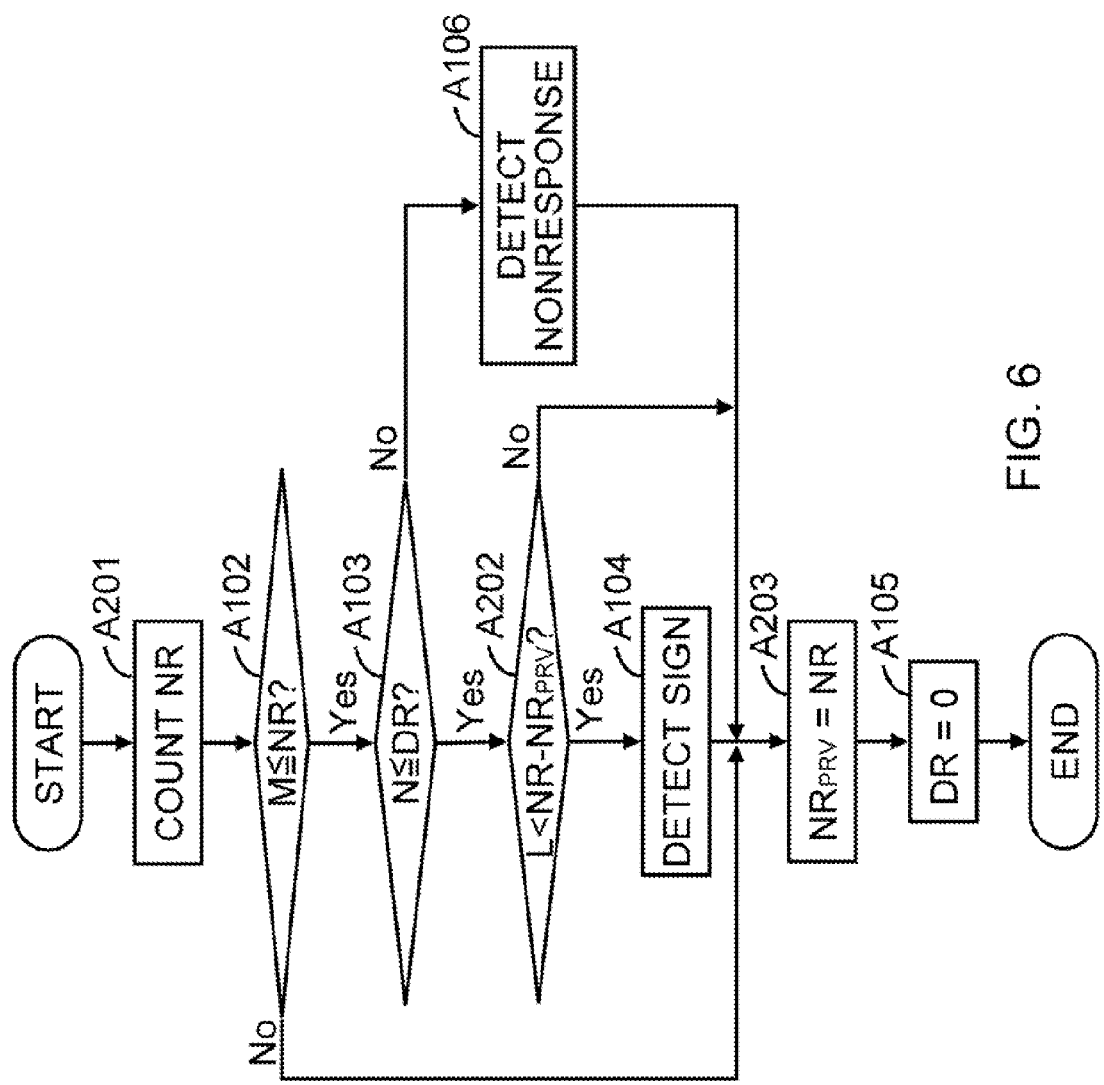
FIG. 6 is a diagram illustrating an exemplary operation flow of a failure detecting unit and a notifying unit of a failure detection apparatus according to an embodiment of the present invention.

FIG. 6 illustrates an exemplary operation flow of the failure detecting unit 22 and the notifying unit 23 of the failure detection apparatus 1 according to the present modified embodiment. In the present modified embodiment, A201 is performed instead of A101 illustrated in FIG. 5. In addition, A202 and A203 are added to the operation flow illustrated in FIG. 5. In the following discussion, like reference signs designate like parts.

In A201, the counter 221 references the first table 31 and the timer or the internal clock to count the number NR of nonresponded requests for which responses are not provided for the current cycle.

In A102, the third determining unit 222 determines whether or not the number NR of the nonresponded requests is equal to or larger than the threshold M.

In A103, when the number NR of the nonresponded requests is equal to or larger than the threshold M ("Yes" in A102), the third determining unit 222 determines whether or not the number DR of dynamic responses counted by the table creating unit 213 is equal to or larger than the threshold N.

In A202, when the number DR of the dynamic responses is equal to or larger than the threshold N ("Yes" in A103), the failure detecting unit 22 calculates the difference (hereinafter also merely referred to as the nonresponded request difference) between the number NR of the nonresponded requests and the number NR$_{PRV}$ of nonresponded requests for which responses are not provided for the previous cycle. The third determining unit 222 determines whether or not the nonresponded request difference is larger than a predetermined threshold L.

In A104, when the nonresponded request difference is larger than the threshold L ("Yes" in A202), the third determining unit 222 determines that there is a sign that the server system becomes the nonresponding state. The notifying unit 23 notifies the administrator by an email or the like that there is a sign that the server system becomes the nonresponding state.

In A203, the failure detecting unit 22 updates the number NR$_{PRV}$ with the number NR.

In A105, the failure detecting unit 22 resets the number DR of the dynamic responses counted by the table creating unit 213 to zero.

In A203, when the nonresponded request difference is equal to or smaller than the threshold L ("No" in A202), the third determining unit 222 determines that the nonresponded request difference only indicates that the server system slowly responds, and the third determining unit 222 determines that there is no failure caused by the nonresponded requests in the server system. Then, the failure detecting unit 22 updates the number NR$_{PRV}$ with the number NR.

In A105, the failure detecting unit 22 resets the number DR of the dynamic responses counted by the table creating unit 213 to zero.

In A106, when the number DR of the dynamic responses counted by the table creating unit 213 is smaller than the threshold N ("No" in A103), the third determining unit 222 determines that the server system is in the nonresponding state. The notifying unit 23 notifies the administrator by an email or the like that the server system is in the nonresponding state.

In A203, the failure detecting unit 22 updates the number NR$_{PRV}$ with the number NR.

In A105, the failure detecting unit 22 resets the number DR of the dynamic responses counted by the table creating unit 213 to zero.

In A203, when the number NR of the nonresponded requests is smaller than the threshold M ("No" in A102), the third determining unit 222 determines that there is no failure in the server system, and the failure detecting unit 22 updates the number NR$_{PRV}$ with the number NR.

In A105, the failure detecting unit 22 resets the number DR of the dynamic responses counted by the table creating unit 213 to zero.

In the failure detection apparatus 1 according to the present modified embodiment, effects that are the same as the effects obtained in the first embodiment may be obtained. In addition, since the failure detection apparatus 1 detects the occurrence of a failure on the basis of the nonresponded request difference, the failure detection apparatus 1 may more accurately detect the occurrence of the failure. Specifically, when the number NR of nonresponded requests is large and the nonresponded request difference is small, the third determining unit 222 may suppose that the server system slowly responds, and determine that there is no failure caused by the nonresponded requests in the server system. Thus, the failure detection apparatus 1 according to the present modified embodiment may more accurately detect the occurrence of a failure in the server system.

Second Modified Embodiment

In the aforementioned embodiments, the second determining unit 212 determines whether or not a packet is a dynamic request on the basis of the path included in the URL described in the HTTP header portion of the packet. However, the second determining unit 212 is not limited to this.

For example, the second determining unit 212 may determine whether or not a packet is a dynamic request on the basis of a hash value obtained by applying a hash function to a payload of the packet determined to be a request. In the following discussion, like reference numerals and signs designate like parts.

The table creating unit 213 according to a second modified embodiment functions as the table creating unit 213 according to the aforementioned embodiments and also creates a second table 32A. Specifically, the table creating unit 213 references the payload of the packet to calculate a hash value and creates the second table 32A by recording the calculated hash value to the storage unit 3.

FIG. 7 illustrates an exemplary data structure of the second table 32A according to the present modified embodiment. On the second table 32A illustrated in FIG. 7, information regarding whether or not a hash value (referred to as a request hash value) of a request is changed, and information regarding whether or not a hash value (referred to as a response hash value) of a response is changed, are recorded in association with each path. On the second table 32A illustrated in FIG. 7, the request hash value (not illustrated) and the response hash value (not illustrated) are also recorded in association with each path. The second table 32A is stored in the storage unit 3, for example. In FIG. 7, as a value indicating that a hash value is changed, "CHANGED" is employed, while as a value indicating that a hash value is fixed, "FIXED" is employed. In FIG. 7, detailed hash values are omitted for convenience of illustration.

The table creating unit 213 applies a hash function such as a message digest algorithm (MD) or a secure hash algorithm (SHA) to the payloads of the packets determined to be requests and responses so as to calculate the request hash values and the response hash values, respectively.

The table creating unit 213 calculates a hash value from the payload of a packet determined to be a request and records the calculated hash value on the second table 32A. At this time, when information regarding a preceding request is already recorded in association with the same path, the table creating unit 213 compares the calculated request hash value with a hash value of the preceding request. When the compared request hash values are different from each other, the table creating unit 213 records, on the second table 32A, a value (such as a flag) indicating that the request hash value is changed. When the compared request hash values are equal to each other, the table creating unit 213 records, on the second table 32A, a value (such as a flag) indicating that the request hash value is fixed. When the information regarding the preceding request is already recorded in association with the same path, it is not necessary to newly record the request hash value. In this case, the request hash value that has been first recorded on the second table 32A in association with the same path is used for the comparison.

In a similar manner, the table creating unit 213 calculates a hash value from the payload of a packet determined to be a response and records the calculated hash value on the second table 32A. At this time, when information regarding a preceding response is already recorded in association with the same path, the table creating unit 213 compares the calculated response hash value with the preceding response. When the compared response hash values are different from each other, the table creating unit 213 records, on the second table 32A, a value (such as a flag) indicating that the response hash value is changed. When the compared response hash values are equal to each other, the table creating unit 213 records, on the second table 32A, a value (such as a flag) indicating that the response hash value is fixed. When information regarding the preceding response is already recorded in association with the same path, it is not necessary to newly record the response hash value. In this case, the response hash value that has been first recorded on the second table 32A in association with the same path is used for the comparison.

The table creating unit 213 records, as illustrated in FIG. 3, a TCP connection ID, a path and a time of request on the first table 31 on the basis of a packet determined to be a request regardless of whether or not the request is a dynamic request. The table creating unit 213 acquires a TCP connection ID from a packet determined to be a response and compares the acquired TCP connection ID (for the response) with the TCP connection IDs (for the requests) recorded on the first table 31. The table creating unit 213 may determine, on the basis of a path corresponding to a matched TCP connection ID in the comparison, whether or not information regarding the request that corresponds to the matched TCP connection ID is already recorded on the second table 32A.

The second determining unit 212 according to the present modified embodiment determines whether or not the request is a dynamic request on the basis of the hash value. Specifically, when the request hash value recorded on the second table 32A or the response hash value recorded on the second table 32A indicates that the hash value is changed, the second determining unit 212 determines that the request is a dynamic request. The second determining unit 212 may determine that the request is a dynamic request when the request hash value recorded on the second table 32A indicates that the hash value is changed and the response hash value recorded on the second table 32A indicates that the hash value is changed. When the second determining unit 212 determines whether or not the request is a dynamic request only on the basis of the request hash value, it is sufficient if the second table 32A has at least the path and the request hash value. In addition, when the second determining unit 212 determines whether or not the request is a dynamic request only on the basis of the response hash value, it is sufficient if the second table 32A has at least the path and the response hash value.

Figure 8:
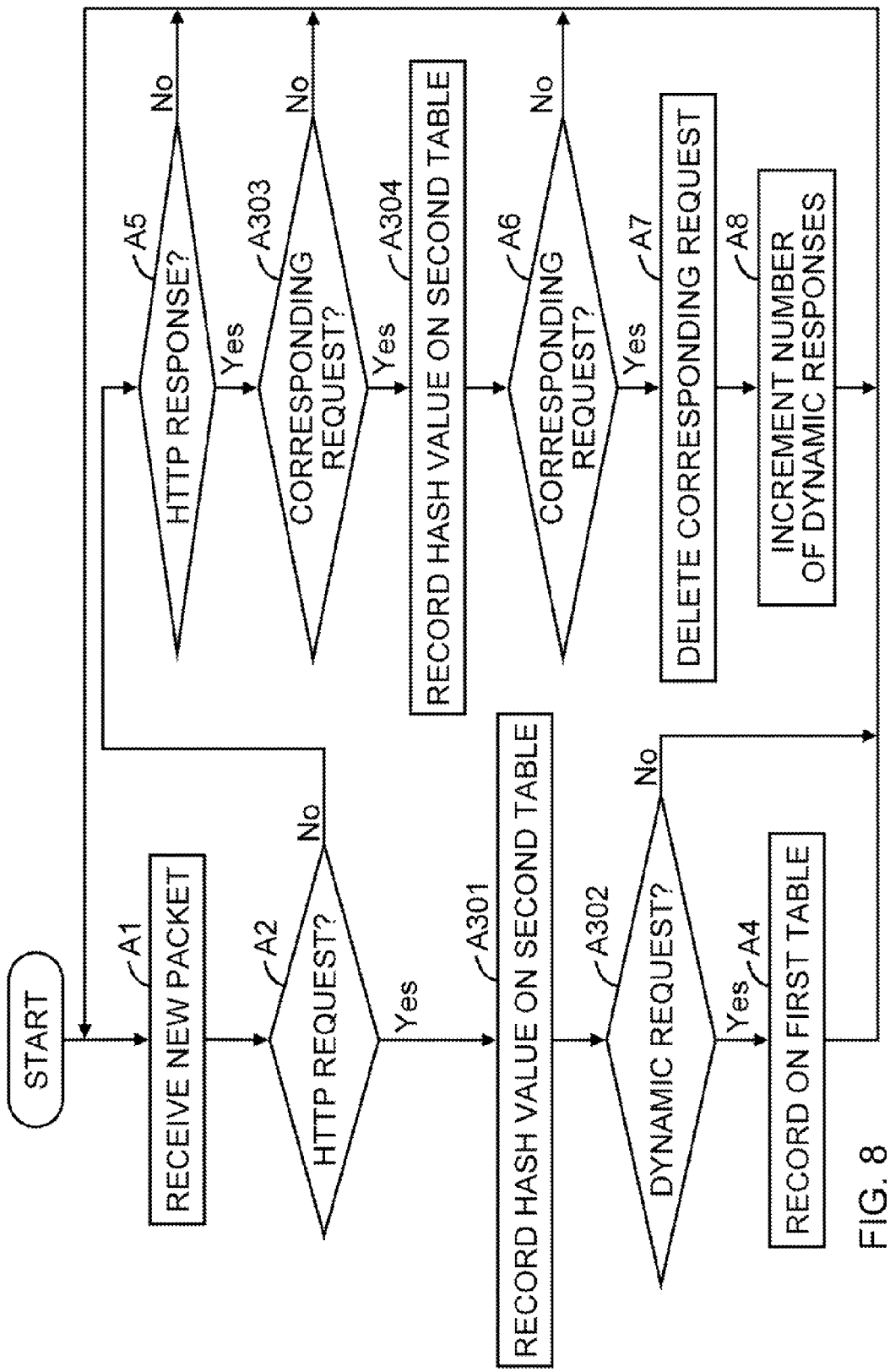
FIG. 8 is a diagram illustrating an exemplary operation flow of a processing unit of a failure detection apparatus according to an embodiment of the present invention.

FIG. 8 illustrates an exemplary operation flow of the processing unit 21 of the failure detection apparatus 1 according to the present modified embodiment. In the present modified embodiment, A302 is performed instead of A3 illustrated in FIG. 4. In addition, A301, A303 and A304 are added to the operation flow illustrated in FIG. 4. In the following discussion, like reference signs designate like parts.

In A1, the input interface unit 4 receives a new packet.

In A2, the first determining unit 211 references the HTTP header of the received packet to determine whether or not the received packet is a request.

In A301, when the first determining unit 211 determines that the received packet is a request ("Yes" in A2), the table creating unit 213 acquires a path from the received packet, calculates a hash value from the payload of the received packet, and records the calculated hash value on the second table 32A. In this case, when the acquired path has not been recorded on the second table 32A, the table creating unit 213 also records the acquired path on the second table 32A. When a request hash value is already recorded on the second table 32A, the table creating unit 213 compares the calculated hash value with the already recorded request hash value, and records on the second table 32A a flag indicating that the hash value is changed or fixed.

In A302, the second determining unit 212 references the request hash value recorded on the second table 32A or the response hash value recorded on the second table 32A to determine whether or not the received packet is a dynamic request.

In A4, when the second determining unit 212 determines that the received packet is a dynamic request, that is, when either the request hash value or the response hash value is changed ("Yes" in A302), the table creating unit 213 records information regarding the dynamic request on the first table 31.

When the second determining unit 212 determines that the received packet is not a dynamic request, that is, when the request hash value and the response hash value are fixed ("No" in A302), the table creating unit 213 does not record information regarding this request on the first table 31, and the failure detection apparatus 1 returns the process to A1.

In A5, when the first determining unit 211 determines that the received packet is not a request ("No" in A2), the first determining unit 211 references the HTTP header of the received packet to determine whether or not the received packet is a response.

In A303, when the first determining unit 211 determines that the received packet is a response ("Yes" in A5), the table creating unit 213 determines whether or not information regarding a request that corresponds to the response is already recorded on the second table 32A.

In A304, when the table creating unit 213 determines that information regarding a request that corresponds to the response is already recorded on the second table 32A ("Yes" in A303), the table creating unit 213 calculates and records a hash value of the response on the second table 32A. When a response hash value is already recorded on the second table 32A, the table creating unit 213 compares the calculated response hash value with the already recorded response hash value, and records on the second table 32A a flag indicating that the hash value is changed or fixed.

In A6, the table creating unit 213 determines whether or not information regarding a request that corresponds to the response is already recorded on the first table 31.

In A7, when the table creating unit 213 determines that information regarding a request that corresponds to the response is already recorded on the first table 31 ("Yes" in A6), the table creating unit 213 deletes from the first table 31 the information regarding the request that corresponds to the response.

In A8, the table creating unit 213 increments the number of dynamic responses by 1.

When the first determining unit 211 determines that the received packet is not a response ("No" in A5), the failure detection apparatus 1 returns the process to A1. When the table creating unit 213 determines that no information regarding a request that corresponds to the response is recorded on the second table 32A ("No" in A303), the failure detection apparatus 1 returns the process to A1. When the table creating unit 213 determines that no information regarding a request that corresponds to the response is recorded on the first table 31 ("No" in A6), the failure detection apparatus 1 returns the process to A1.

In the failure detection apparatus 1 according to the present modified embodiment, effects that are the same as the effects obtained in the first embodiment may be obtained. In addition, since the failure detection apparatus 1 determines whether or not the received packet is a dynamic request on the basis of the hash value, the failure detection apparatus 1 may determine whether or not the received packet is a dynamic request even when the path does not include information that allows the failure detection apparatus 1 to determine whether or not the received packet is a dynamic request. Thus, the failure detection apparatus 1 may more accurately determine whether or not the received packet is a dynamic request. In addition, the failure detection apparatus 1 may more accurately detect a sign of a failure in the server system.

The process according to the present modified embodiment may be performed on the basis of the size of the payload of the packet, instead of the hash value. In this case, the process may be performed without a hash function. Alternatively, the process may be performed on the basis of a hash value of the size of the payload, instead of the size of the payload.

Third Modified Embodiment

In the first embodiment, the second determining unit 212 determines whether or not a packet is a dynamic request on the basis of the path included in the URL described in the HTTP header portion of the packet. In the second modified embodiment, the second determining unit 212 determines whether or not a packet is a dynamic request on the basis of a hash value calculated from the payload of the packet. However, the second determining unit 212 is not limited to these.

For example, the table creating unit 213 may record the number of responses, an average response time and a response time distribution in association with each path on the second table. In this case, the second determining unit 212 may determine whether or not the received packet is a dynamic request on the basis of the average response time or the response time distribution. In the following discussion, like reference numerals and signs designate like parts.

The table creating unit 213 according to a third modified embodiment functions as the table creating unit 213 according to the first embodiment and also creates a second table.

FIG. 9 illustrates an exemplary data structure of the second table 32B according to the present modified embodiment. On the second table 32B illustrated in FIG. 9, the number of responses, the average response time and the response time distribution are recorded in association with each path.

The number of responses is the number of times of reception of a response to a request by the failure detection apparatus 1. A response time is a time range from the time when the failure detection apparatus 1 receives a request to the time when the failure detection apparatus 1 receives a response to the request. The average response time is an average of the response times. The response time distribution is a distribution of the response times.

The table creating unit 213 records, as illustrated in FIG. 3, a TCP connection ID, a path and a time of request on the first table 31 on the basis of a packet determined to be a request regardless of whether or not the request is a dynamic request. The table creating unit 213 acquires a TCP connection ID from a packet determined to be a response and compares the acquired TCP connection ID (for the response) with the TCP connection IDs (for the requests) recorded on the first table 31. The table creating unit 213 may calculate a response time on the basis of the time of request recorded on the first table 31 in association with a matched TCP connection ID in the comparison and a time when the failure detection apparatus 1 has received the packet determined to be a response and having the matched TCP connection ID. The table creating unit 213 may acquire the time when the failure detection apparatus 1 receives a packet determined to be a response by referencing the timer or the internal clock, for example. In addition, the table creating unit 213 may determine whether or not information regarding a corresponding request is already recorded on the second table 32B on the basis of the path recorded on the first table 31 in association with the matched TCP connection ID.

In addition, for example, the table creating unit 213 may compare the TCP connection IDs of the requests with the TCP connection IDs of the responses to calculate the number of responses by counting the number of matched TCP connection IDs.

The table creating unit 213 calculates the average response time and the response time distribution on the basis of the response times and the number of responses to record the average response time and the response time distribution on the second table 32B.

The second determining unit 212 according to the present modified embodiment determines whether or not the received packet is a dynamic request on the basis of the average response time or the response time distribution. Specifically, the second determining unit 212 compares a predetermined threshold with the average response time (or the response time distribution) recorded on the second table 32B in association with the path of a packet determined to be a request to determine that the packet is a dynamic request.

It is preferable that the threshold for the average response time be, for example, 100 milliseconds when the average response time is used for the comparison. It is preferable that the threshold for the response time distribution be, for example, 10 milliseconds when the response time distribution is used for the comparison. The thresholds are not limited to the aforementioned values, and may be set to various values. When the average response time recorded on the second table 32B or the response time distribution recorded on the second table 32B is equal to or larger than the interested threshold, the second determining unit 212 determines that the received packet is a dynamic request. However, the second determining unit 212 may determine that the received packet is a dynamic request when the average response time recorded on the second table 32B and the response time distribution recorded on the second table 32B are equal to or larger than the interested thresholds, respectively.

When the second determining unit 212 determines whether or not the received packet is a dynamic request only on the basis of the average response time, it is sufficient if the second table 32B has at least the path and the average response time. In addition, when the second determining unit 212 determines whether or not the received packet is a dynamic request only on the basis of the response time distribution, it is sufficient if the second table 32B has at least the path and the response time distribution.

Figure 10:
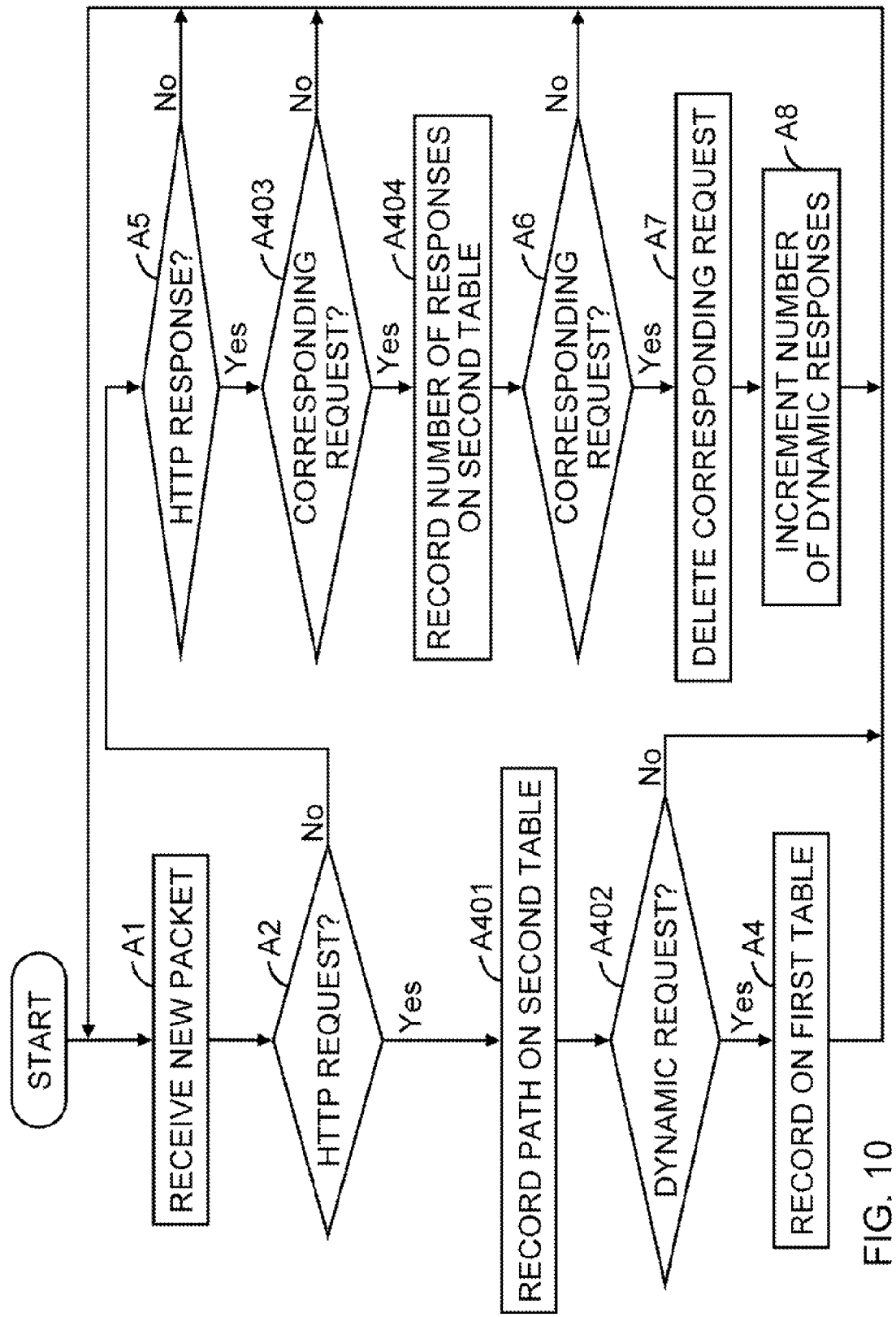
FIG. 10 is a diagram illustrating an exemplary operation flow of a processing unit of a failure detection apparatus according to an embodiment of the present invention.

FIG. 10 illustrates an exemplary operation flow of the processing unit 21 of the failure detection apparatus 1 according to the present modified embodiment. In the present modified embodiment, A402 is performed instead of A3 illustrated in FIG. 4. In addition, A401, A403 and A404 are added to the operation flow illustrated in FIG. 4. In the following discussion, like reference signs designate like parts.

In A1, the input interface unit 4 receives a new packet.

In A2, the first determining unit 211 references the HTTP header of the received packet to determine whether or not the received packet is a request.

In A401, when the first determining unit 211 determines that the received packet is a request ("Yes" in A2), the table creating unit 213 acquires a path from the received packet to record the acquired path on the second table 32B. When the same path is already recorded on the second table 32B, the table creating unit 213 does not record the path on the second table 32B.

In A402, the second determining unit 212 references the average response time (or the response time distribution) recorded on the second table 32B in association with the path of the received packet and the threshold for the average response time (or the response time distribution) to determine whether or not the received packet is a dynamic request.

In A4, when the second determining unit 212 determines that the received packet is a dynamic request, that is, when either the average response time or the response time distribution is equal to or larger than the interested threshold ("Yes" in A402), the table creating unit 213 records information regarding the dynamic request on the first table 31.

When the second determining unit 212 determines that the received packet is not a dynamic request, that is, when the average response time and the response time distribution are respectively smaller than the interested thresholds ("No" in A402), the table creating unit 213 does not record information regarding this request on the first table 31, and the failure detection apparatus 1 returns the process to A1.

In A5, when the first determining unit 211 determines that the received packet is not a request ("No" in A2), the first determining unit 211 references the HTTP header of the received packet to determine whether or not the received packet is a response.

In A403, when the first determining unit 211 determines that the received packet is a response ("Yes" in A5), the table creating unit 213 determines whether or not information regarding a request that corresponds to the response is already recorded on the second table 32B.

In A404, when the table creating unit 213 determines that information regarding a request that corresponds to the response is already recorded on the second table 32B ("Yes" in A403), the table creating unit 213 calculates the average response time and the response time distribution by calculating the number of responses and response times to record the average response time and the response time distribution on the second table 32B.

In A6, the table creating unit 213 determines whether or not information regarding a request that corresponds to the response is already recorded on the first table 31.

In A7, when the table creating unit 213 determines that information regarding a request that corresponds to the response is already recorded on the first table 31 ("Yes" in A6), the table creating unit 213 deletes from the first table 31 the information regarding the request that corresponds to the response.

In A8, the table creating unit 213 increments the number of dynamic responses by 1.

When the first determining unit 211 determines that the received packet is not a response ("No" in A5), the failure detection apparatus 1 returns the process to A1. When the table creating unit 213 determines that no information regarding a request that corresponds to the response is recorded on the second table 32B ("No" in A403), the failure detection apparatus 1 returns the process to A1. When the table creating unit 213 determines that no information regarding a request that corresponds to the response is recorded on the first table 31 ("No" in A6), the failure detection apparatus 1 returns the process to A1.

In the failure detection apparatus 1 according to the present modified embodiment, effects that are the same as the effects obtained in the first embodiment may be obtained.

Fourth Modified Embodiment

The technique disclosed herein is not limited to the aforementioned embodiments and may be variously modified and used without departing from the gist of the aforementioned embodiments.

For example, the CPU 2 achieves the aforementioned functions and may also achieve a function (referred to as a request tree generating function) of generating a request tree by executing a program stored in the storage unit 3.

Figure 11:
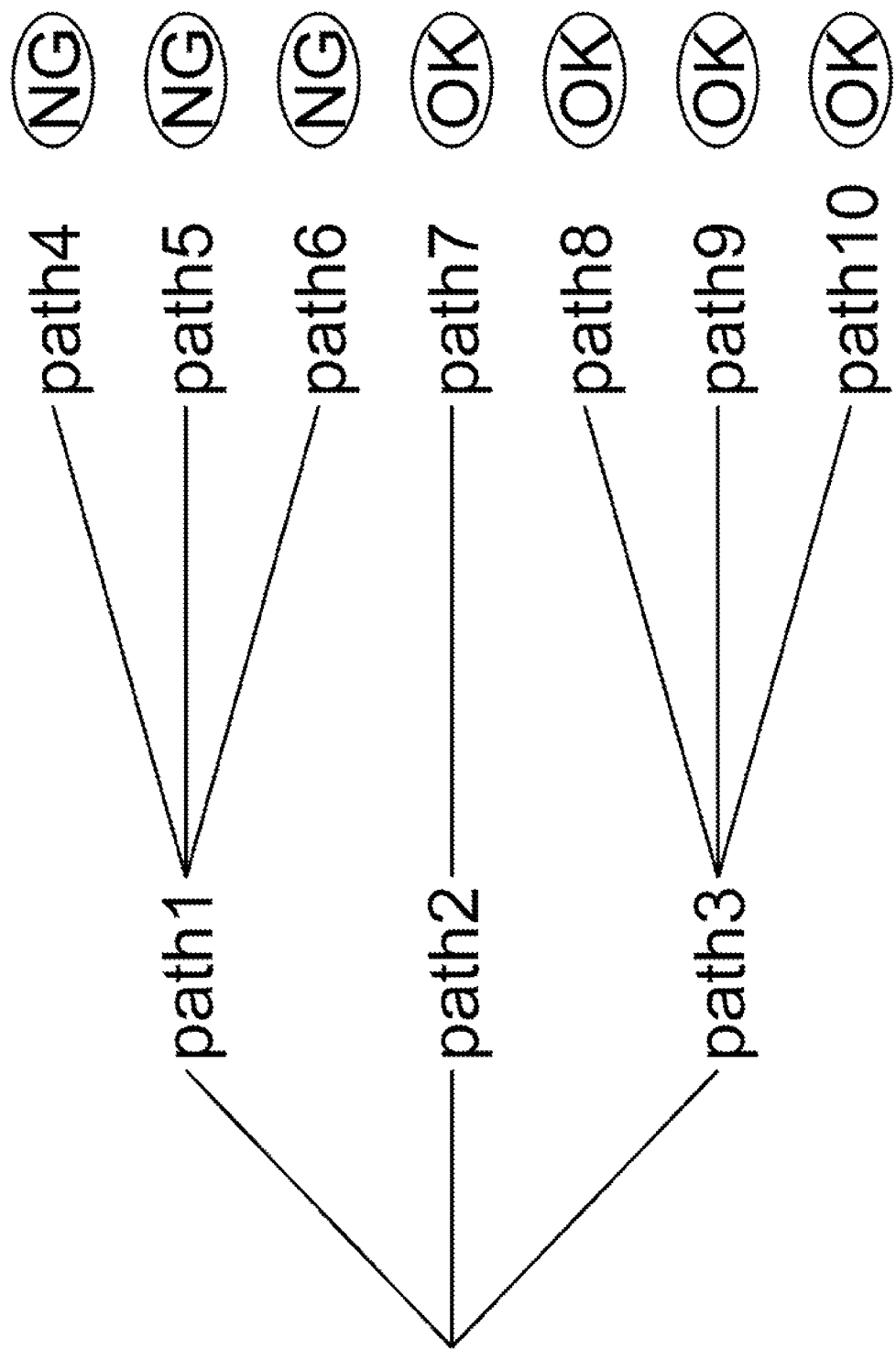
FIG. 11 is a diagram illustrating an exemplary request tree according to an embodiment of the present invention.
Figure 12A:
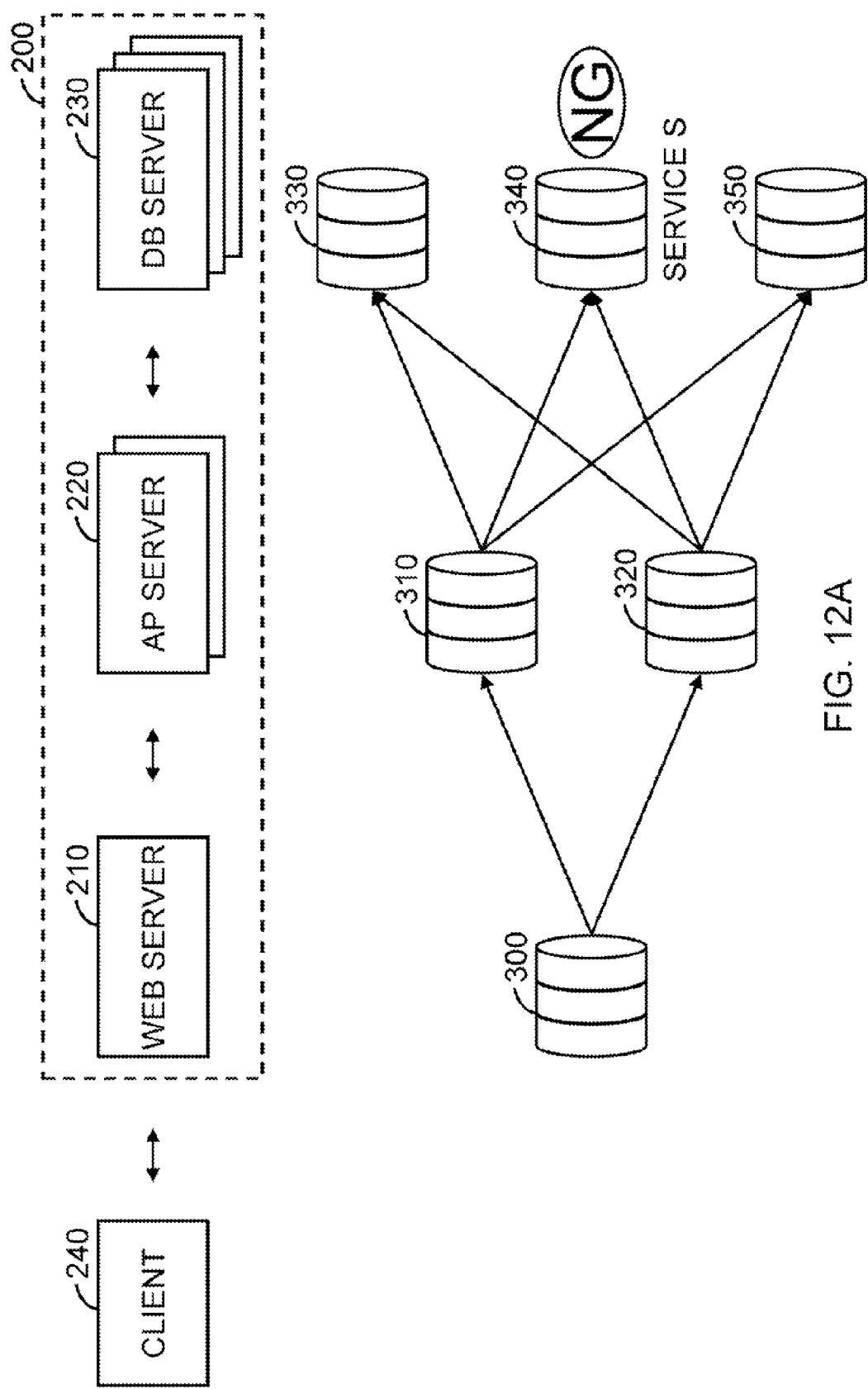
FIGS. 12A to 12C are diagrams illustrating a three-layer system.
Figure 12B:
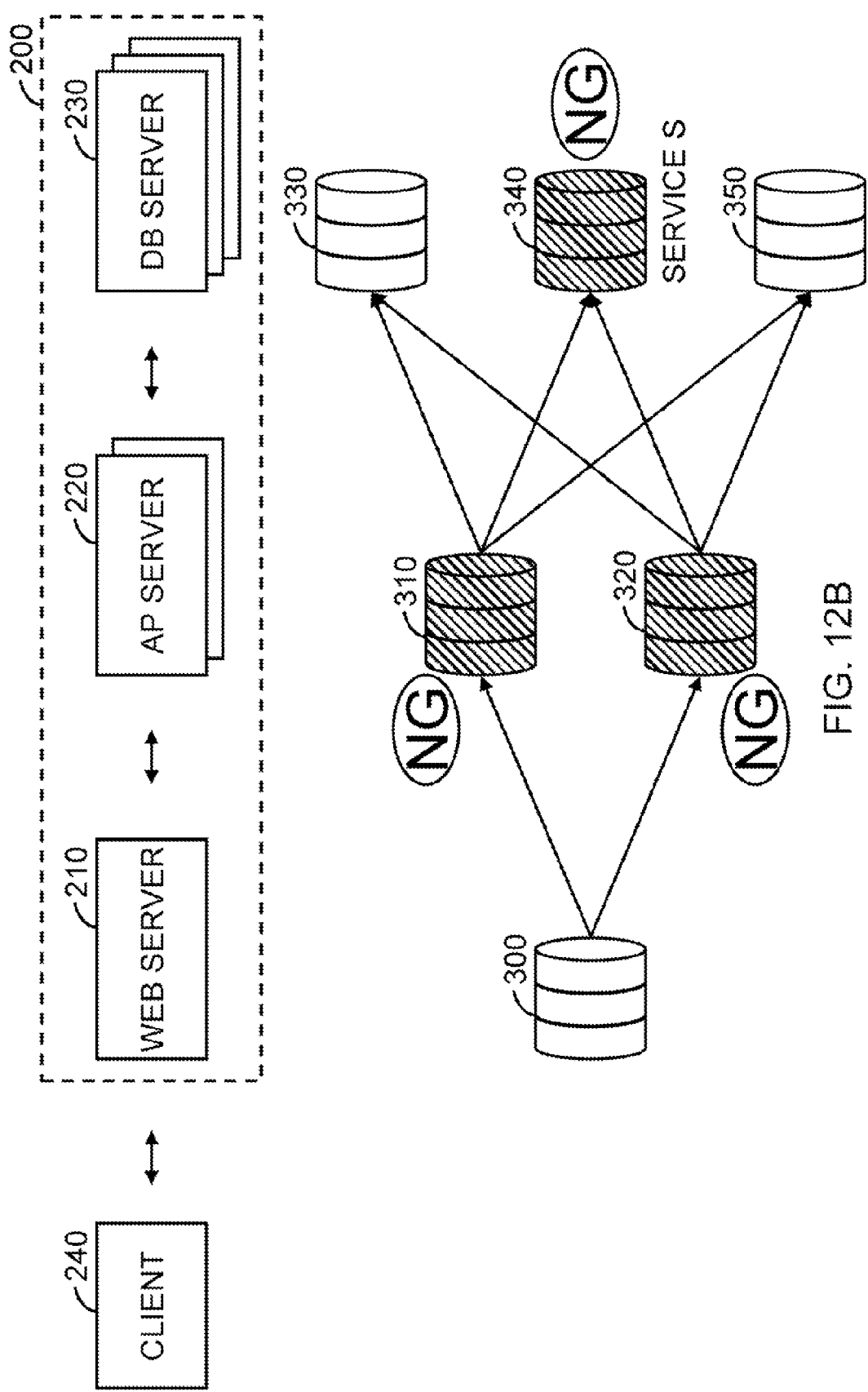
Figure 12C:
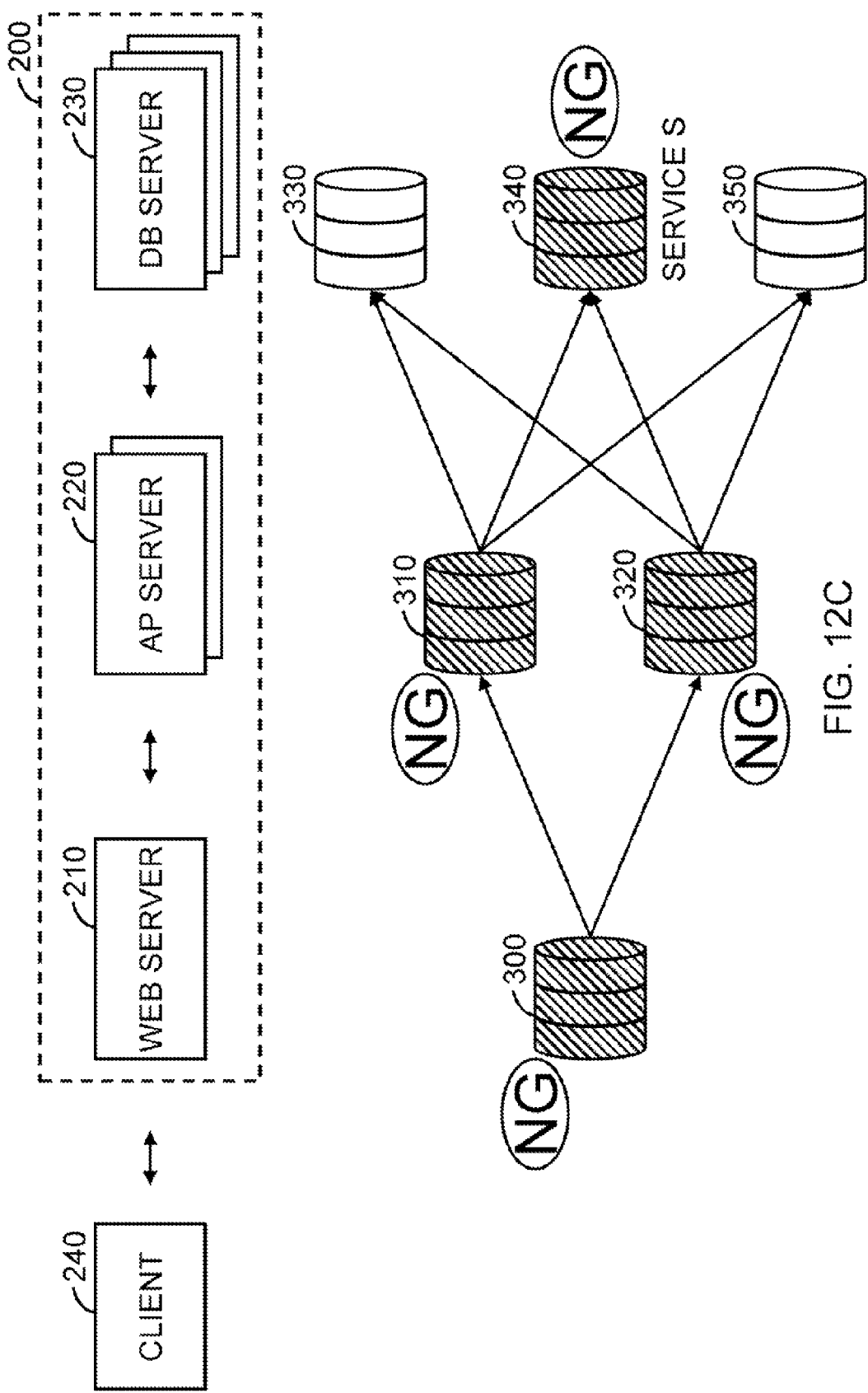

For achieving the request tree generating function, the CPU 2 acquires paths by referencing the HTTP headers of requests determined by the second determining unit 212 to be a dynamic request to generate a request tree and stores the generated paths in a tree format (as illustrated in FIG. 11) in the storage unit 3, for example. The CPU 2 may achieve the request tree generating function after A102 or A101 illustrated in FIG. 5.

In addition, the CPU 2 records the fact (indicated by "OK" in FIG. 11) that a response is provided for a path corresponding to a request determined by the table creating unit 213 to be provided with the response. In addition, the CPU 2 records the fact (indicated by an "NG" in FIG. 11) that a response is not provided for a path corresponding to a request determined by the counter 221 not to be provided with a response for the time period of T seconds or more. When the two facts, i.e., the fact that a response is provided and the fact that a response is not provided, collide with each other for the same path, the CPU 2 may record either one of the two facts.

FIG. 11 illustrates an exemplary request tree according to the present modified embodiment. The request tree illustrated in FIG. 11 indicates that requests having paths "path1/path4", "path1/path5" and "path1/path6" have not been provided with a response for the time period of T seconds or more. In addition, the request tree indicates requests having paths "path2/path7", "path3/path8", "path3/path9" and "path3/path10" have been provided with a response.

The notifying unit 23 references the request tree to extract a common part of the paths indicating that no response is provided for the time period of T seconds or more. Then, the notifying unit 23 notifies the administrator of the common part in addition to the fact that there is a sign that the server system becomes the nonresponding state or the fact that the server system is in the nonresponding state.

In the failure detection apparatus 1 according to the present modified embodiment, effects that are the same as the effects obtained in the first embodiment may be obtained. Since the failure detection apparatus 1 according to the present modified embodiment notifies the administrator of the part that is common to the paths indicating that no response is provided for the time period of T seconds or more, the administrator may easily and quickly determine the cause of a failure.

Other Modifications

The technique disclosed herein is not limited to the aforementioned embodiments and may be variously modified and used without departing from the gist of the aforementioned embodiments.

For example, the request hash value and the response hash value for each path are recorded on the second table 32A according to the second modified embodiment. However, data recorded on the second table 32A is not limited to the request hash values and the response hash values. For example, the request hash value, the response hash value, the average response time and the response time distribution for each of the paths may be recorded on the second table 32A. In this case, the second determining unit 212 determines whether or not the packet is a dynamic request on the basis of the request hash value, the response hash value, the average response time and the response time distribution, for example.

The system 100 according to the aforementioned embodiments includes two clients 10. However, the number of clients 10 included in the system 100 is not limited to two. The system 100 may include one client 10 or may include three or more clients 10.

The system 100 according to the aforementioned embodiments includes one web server 40. However, the number of web servers 40 included in the system 100 is not limited to one. The system 100 may include two or more web servers 40.

The system 100 according to the aforementioned embodiments includes one application server 50. However, the number of application servers 50 included in the system 100 is not limited to one. The system 100 may include two or more application servers 50.

The system 100 according to the aforementioned embodiments includes one database server 60. However, the number of database servers 60 included in the system 100 is not limited to one. The system 100 may include two or more database servers 60.

In the system 100 according to the aforementioned embodiments, the failure detection apparatus 1 receives the packet via the branch unit 20. However, the configuration is not limited to this. The failure detection apparatus 1 may receive the packet via a monitor port of the switch 30. Alternatively, the failure detection apparatus 1 may be arranged between the clients 10 and the switch 30, like a gateway, to receive the packet.

The failure detecting unit 22 according to the aforementioned embodiments detects a failure on the basis of the number of dynamic requests for which responses are not provided for the time period of T seconds or more and the number of dynamic requests for which responses are provided. However, the failure detecting unit 22 is not limited to this. For example, the failure detecting unit 22 may determine whether or not responses are provided for all requests within the time period of T seconds. The failure detecting unit 22 may detect a failure on the basis of the number of all requests for which responses are not provided for the time period of T seconds or more and the number of all requests for which responses are provided.

The system 100 according to the aforementioned embodiments includes a three-layer system that includes the web server 40, the application server 50 and the database server 60. However, the system 100 is not limited to this. For example, the system 100 may include a two-layer system that includes a plurality of servers. Alternatively, the system 100 may include a server system of four or more layers including a plurality of servers.

The various application programs that are executed to achieve the functions of the CPU 2 included in the failure detection apparatus 1 are stored in a computer-readable recording medium such as a compact disc (CD), a compact disc read-only memory (CD-ROM), CD recordable (CD-R), CD rewritable (CD-RW) or the like, a digital versatile disc (DVD), DVD-ROM, DVD-RAM, DVD-R, DVD plus R (DVD+R), DVD-RW, DVD plus RW (DVD+RW), HD DVD or the like, a Blu-ray disc, a magnetic disk, an optical disc, or a magneto-optical disc. A computer reads the programs from the computer-readable recording medium, transfers the programs to an internal or external storage device, stores the programs in the storage device and uses the programs. The programs may be stored in a storage device (recording medium) such as a magnetic disk, an optical disc or a magneto-optical disc and provided from the storage device through a communication path to the computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been discussed in detail, it should be understood that the various changes, substitutions, and alterations could be made hereto without departing from the spirit and scope of the invention.

What is claimed is:

1. An information processing apparatus comprising:
a processor to:
receive requests transmitted from a client apparatus to a server apparatus, the client apparatus being different from the information processing apparatus,
receive responses transmitted from the server apparatus to the client apparatus in response to the requests,
count a first number of first requests having no corresponding response within a first time period,
count a second number of second requests having a corresponding response, and
detect a failure in the server apparatus based on the first number and the second number.

2. The information processing apparatus according to claim 1, wherein the processor:
   determines whether a received request is a dynamic request,
   counts the first number of first dynamic requests among the first requests, and
   counts the second number of second dynamic requests among the second requests.

3. The information processing apparatus according to claim 2, wherein the processor determines whether a received request is a dynamic request on the basis of a type of a requested object.

4. The information processing apparatus according to claim 2, wherein the processor determines whether a received request is a dynamic request on the basis of a size of a payload of the received request.

5. The information processing apparatus according to claim 2, wherein the processor determines whether a received request is a dynamic request on the basis of a hash value of a payload of the received request.

6. The information processing apparatus according to claim 4, wherein the processor determines a third request as a dynamic request when a size of a payload of the third request is different from a size of a payload of a fourth request preceding the third request, the third request and the fourth request being transmitted from the same client apparatus to the same server apparatus for the same object.

7. The information processing apparatus according to claim 5, wherein the processor determines a third request as a dynamic request when a hash value of a payload of the third request is different from a hash value of a payload of a fourth request preceding the third request, the third request and the fourth request being transmitted from the same client apparatus to the same server apparatus for the same object.

8. The information processing apparatus according to claim 1, wherein the processor determines, when the first number exceeds a first threshold and the second number exceeds a second threshold, that there is a sign that the server apparatus becomes a nonresponding state.

9. The information processing apparatus according to claim 8, wherein the processor determines, when the first number exceeds the first threshold and the second number is less than the second threshold, that the server apparatus is in a nonresponding state.

10. The information processing apparatus according to claim 1, wherein the processor detects a failure on the basis of the first number, the second number, and a third number derived by subtracting from the first number a fourth number of third requests having no corresponding response within a second time period immediately preceding the first time period.

11. The information processing apparatus according to claim 10, wherein the processor detects a failure when the first number exceeds a first threshold, the second number exceeds a second threshold, and the third number exceeds a third threshold.

12. The information processing apparatus according to claim 1, wherein the processor determines whether a received packet is a response to a request packet on basis of information at an application layer of Open Systems Interconnection (OSI) model, the information being included in the received packet.

13. An information processing method comprising:
   receiving, by an information processing apparatus, requests transmitted from a client apparatus to a server apparatus, the client apparatus being different from the information processing apparatus;
   receiving responses transmitted from the server apparatus to the client apparatus in response to the requests;
   counting a first number of first requests having no corresponding response within a first time period;
   counting a second number of second requests having a corresponding response; and
   detecting, by the information processing apparatus, a failure in the server apparatus based on the first number and the second number.

14. The information processing method according to claim 13, further comprising:
   determining whether a received request is a dynamic request,
   wherein the information processing apparatus
      counts the first number of first dynamic requests among the first requests, and
      counts the second number of second dynamic requests among the second requests.

15. The information processing method according to claim 14, wherein the information processing apparatus determines whether a received request is a dynamic request on the basis of a type of a requested object.

16. The information processing method according to claim 14, wherein the information processing apparatus determines whether a received request is a dynamic request on the basis of a hash value of a payload of the received request.

17. The information processing method according to claim 16, wherein the information processing apparatus determines a third request as a dynamic request when a hash value of a payload of the third request is different from a hash value of a payload of a fourth request preceding the third request, the third request and the fourth request being transmitted from the same client apparatus to the same server apparatus for the same object.

18. The information processing method according to claim 13, wherein the information processing apparatus determines, when the first number exceeds a first threshold and the second number exceeds a second threshold, that there is a sign that the server apparatus becomes a nonresponding state.

19. The information processing method according to claim 18, wherein the information processing apparatus determines, when the first number exceeds the first threshold and the second number is less than the second threshold, that the server apparatus is in a nonresponding state.

20. A computer-readable, non-transitory medium storing a program that causes a computer to execute a procedure, the procedure comprising:
   receiving requests transmitted from a client apparatus to a server apparatus, the client apparatus being different from the computer;
   receiving responses transmitted from the server apparatus to the client apparatus in response to the requests;
   counting a first number of first requests having no corresponding response within a first time period;
   counting a second number of second requests having a corresponding response; and
   detecting a failure in the server apparatus based on the first number and the second number.

* * * * *